(12) United States Patent
Morisaki (10) Patent No.: US 9,333,863 B2
(45) Date of Patent: May 10, 2016

(54) VEHICLE, AND CONTROL METHOD AND CONTROL DEVICE FOR VEHICLE

(75) Inventor: Keisuke Morisaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 265 days.

(21) Appl. No.: 14/238,550

(22) PCT Filed: Aug. 25, 2011

(86) PCT No.: PCT/JP2011/069150
§ 371 (c)(1),
(2), (4) Date: Feb. 12, 2014

(87) PCT Pub. No.: WO2013/027290
PCT Pub. Date: Feb. 28, 2013

(65) Prior Publication Data
US 2014/0210261 A1   Jul. 31, 2014

(51) Int. Cl.
*B60L 1/00* (2006.01)
*B60L 3/00* (2006.01)
(Continued)

(52) U.S. Cl.
CPC ............... *B60L 11/12* (2013.01); *B60K 6/445* (2013.01); *B60L 1/003* (2013.01); *B60L 3/0046* (2013.01); *B60L 3/04* (2013.01); *B60L 11/123* (2013.01); *B60L 11/14* (2013.01); *B60L 11/1861* (2013.01); *B60L 11/1868* (2013.01); *B60L 15/007* (2013.01); *B60L 15/2045* (2013.01); *B60W 10/06* (2013.01); *B60W 10/26* (2013.01); *B60W 20/00* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2270/20* (2013.01); *B60W 20/106* (2013.01); *B60W 2510/0604* (2013.01); *Y02T 10/6217* (2013.01); *Y02T 10/6239* (2013.01); *Y02T 10/642* (2013.01); *Y02T 10/7005* (2013.01); *Y02T 10/7044* (2013.01); *Y02T 10/7066* (2013.01); *Y02T10/7077* (2013.01); *Y02T 10/7216* (2013.01); *Y02T 10/7241* (2013.01); *Y02T 10/7283* (2013.01)

(58) Field of Classification Search
CPC ......... B60L 11/12; B60K 6/448; B60W 20/00
USPC ........................................................ 307/10.1
See application file for complete search history.

(56) References Cited

U.S. PATENT DOCUMENTS

2006/0058897 A1* 3/2006 Senda .................... B60R 16/03
                                                                    700/22
2007/0210743 A1   9/2007 Tabei et al.
2008/0190703 A1   8/2008 Kato et al.

FOREIGN PATENT DOCUMENTS

DE   10 2005 040 077 A1   3/2006
JP   2004-229461          8/2004
(Continued)

*Primary Examiner* — Carlos Amaya
(74) *Attorney, Agent, or Firm* — Finnegan, Henderson, Farabow, Garrett & Dunner, LLP (57) ABSTRACT

A vehicle includes a traveling battery storing electric power, an auxiliary battery connected to the traveling battery, a DC/DC converter supplying the electric power from the traveling battery to the auxiliary battery, and an engine operated at a load corresponding to the electric power supplied from the traveling battery to the auxiliary battery. If the load of the engine is smaller than a threshold value during load operation of the engine, the DC/DC converter supplies the electric power from the traveling battery to the auxiliary battery.

6 Claims, 7 Drawing Sheets

(51) Int. Cl.
*H02G 3/00* (2006.01)
*B60L 11/12* (2006.01)
*B60K 6/445* (2007.10)
*B60W 10/06* (2006.01)
*B60W 10/26* (2006.01)
*B60W 20/00* (2016.01)
*B60L 11/18* (2006.01)
*B60L 3/04* (2006.01)
*B60L 11/14* (2006.01)
*B60L 15/00* (2006.01)
*B60L 15/20* (2006.01)

(56) References Cited

FOREIGN PATENT DOCUMENTS

| | | |
|---|---|---|
| JP | 2005-39886 | 2/2005 |
| JP | 2005-94922 | 4/2005 |
| JP | 2007-237905 | 9/2007 |
| JP | 2008-94233 | 4/2008 |
| JP | 2008-189236 | 8/2008 |
| JP | 2010-4679 | 1/2010 |
| WO | WO 2005/100230 | 10/2005 |

* cited by examiner

VEHICLE, AND CONTROL METHOD AND CONTROL DEVICE FOR VEHICLE

CROSS-REFERENCE TO RELATED APPLICATIONS

This application is a national phase application of International Application No. PCT/JP2011/069150, filed Aug. 25, 2011, the content of which is incorporated herein by reference.

TECHNICAL FIELD

The present invention relates to a vehicle, and a control method and a control device for a vehicle, and in particular to a technique of supplying electric power, in a vehicle equipped with a first power storage device and a second power storage device, from the first power storage device to the second power storage device.

BACKGROUND ART

Hybrid vehicles equipped with an electrically-powered motor as a drive source in addition to an engine, or electric vehicles including a cruising distance extension function (range extender) are known. In such a vehicle, the amount of fuel supply to the engine is reduced by outputting, from the electrically-powered motor, a motor torque equivalent to an engine torque that can be output from the engine, as described for example in Japanese Patent Laying-Open No. 2005-39886 (PTD 1).

CITATION LIST

Patent Document

PTD 1: Japanese Patent Laying-Open No. 2005-39886

SUMMARY OF INVENTION

Technical Problem

However, when a hybrid vehicle is, for example, a relatively small-sized vehicle, the vehicle cannot be equipped with a large battery, that is, a battery having a large capacity, and thus charging power of the battery is smaller than charging power of a battery in a large-sized hybrid vehicle. Accordingly, it is difficult for the hybrid vehicle equipped with a small battery to have an opportunity to operate an engine in a high-load region in which the engine has high efficiency in order to generate large electric power to be charged in the battery. As a result, such a vehicle has no choice but to operate the engine in a low-load region in which the engine has low efficiency.

One object of the present invention is to improve efficiency of an engine.

Solution to Problem

In one embodiment, a vehicle includes a first power storage device storing electric power, a second power storage device connected to the first power storage device, a supply device supplying the electric power from the first power storage device to the second power storage device, and an engine operated at a load corresponding to the electric power supplied from the first power storage device to the second power storage device. If the load of the engine is smaller than a threshold value during load operation of the engine, the supply device supplies the electric power from the first power storage device to the second power storage device.

With this configuration, the load of the engine is increased by supplying the electric power from the first power storage device to the second power storage device. Therefore, in an engine having a characteristic that the engine has good efficiency in a high-load operation region, the efficiency of the engine is improved.

In another embodiment, the supply device stops supply of the electric power from the first power storage device to the second power storage device during no-load operation of the engine.

With this configuration, a loss due to the supply of the electric power from the first power storage device to the second power storage device is reduced when it is not possible to increase the load of the engine to improve efficiency.

In still another embodiment, the supply device stops supply of the electric power from the first power storage device to the second power storage device during idle operation of the engine.

With this configuration, a loss due to the supply of the electric power from the first power storage device to the second power storage device is reduced when it is not possible to increase the load of the engine to improve efficiency.

In still another embodiment, the vehicle further includes a generator generating electric power by being driven by the engine, and supplying electric power corresponding to the electric power supplied from the first power storage device to the second power storage device, to the first power storage device. The engine is operated at a load corresponding to the electric power generated by the generator.

With this configuration, in a vehicle configured to store electric power generated using an engine in a power storage device, the efficiency of the engine can be improved.

In still another embodiment, the supply device is a converter,

With this configuration, the electric power can be supplied from the first power storage device to the second power storage device via the converter, at a desired voltage.

Advantageous Effects of Invention

Since the load of the engine is increased, in an engine having a characteristic that the engine has good efficiency in a high-load operation region, the efficiency of the engine is improved.

DESCRIPTION OF EMBODIMENTS

Hereinafter, an embodiment of the present invention will be described with reference to the drawings. In the description below, identical parts will be designated by the same reference numerals. Since their names and functions are also the same, the detailed description thereof will not be repeated.

Figure 1:
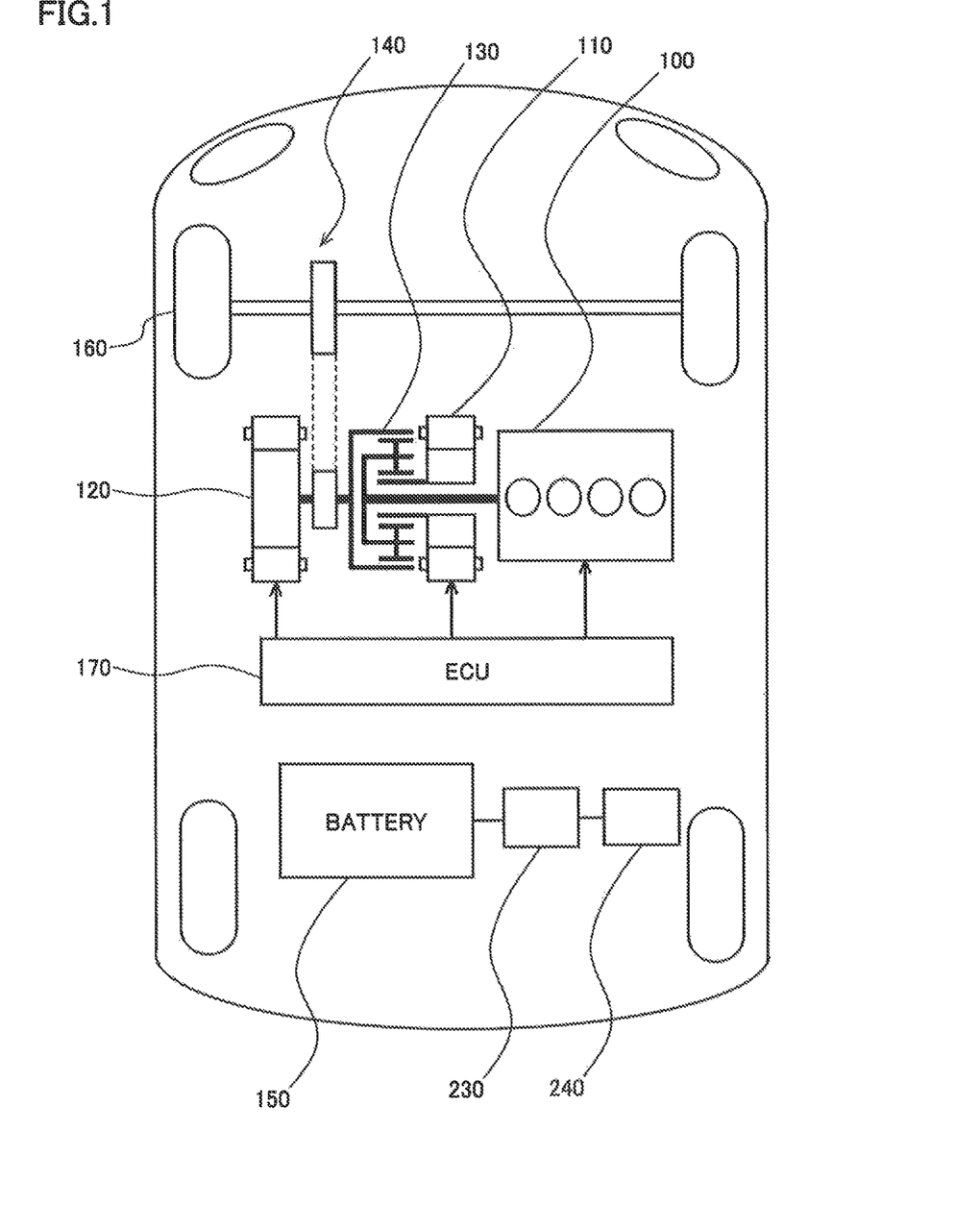
FIG. 1 is a schematic configuration diagram showing a hybrid vehicle.

Referring to FIG. 1, a hybrid vehicle includes an engine 100, a first motor generator 110, a second motor generator 120, a motive power split mechanism 130, a reduction gear 140, and a battery 150.

The vehicle travels using a drive force from at least one of engine 100 and second motor generator 120.

Engine 100, first motor generator 110, and second motor generator 120 are connected via motive power split mechanism 130. Motive power generated by engine 100 is split by motive power split mechanism 130 into two paths. One is a path for driving front wheels 160 via reduction gear 140. The other is a path for driving first motor generator 110 to generate electric power.

First motor generator 110 is a three-phase alternating current (AC) rotating electric machine including a U-phase coil, a V-phase coil, and a W-phase coil. First motor generator 110 generates electric power using the motive power of engine 100 split by motive power split mechanism 130. The electric power generated by first motor generator 110 is used in different ways, depending on the traveling state of the vehicle and the state of the remaining capacity (SOC) of battery 150. For example, during normal traveling, the electric power generated by first motor generator 110 is directly used as electric power for driving second motor generator 120. On the other hand, when the remaining capacity of battery 150 is lower than a predetermined value, the electric power generated by first motor generator 110 is converted from AC to direct current (DC) by an inverter described later. Thereafter, the voltage is adjusted by a converter described later, and the electric power is stored in battery 150.

When first motor generator 110 acts as a generator, first motor generator 110 generates a negative torque. Here, the negative torque refers to a torque which serves as a load of engine 100. When first motor generator 110 receives supply of electric power and acts as a motor, first motor generator 110 generates a positive torque. Here, the positive torque refers to a torque which does not serve as the load of engine 100, that is, a torque which assists rotation of engine 100. The same applies to second motor generator 120.

In the present embodiment, when control for starting engine 100 is performed, first motor generator 110 acts as a motor. First motor generator 110 cranks engine 100, When control for stopping engine 100 is performed, first motor generator 110 acts as a generator to generate a negative torque. In the control for stopping engine 100 by first motor generator 110, first motor generator 110 is controlled such that a predetermined crank angle is obtained.

Second motor generator 120 is a three-phase AC rotating electric machine including a U-phase coil, a V-phase coil, and a W-phase coil. Second motor generator 120 is driven by at least one of the electric power stored in battery 150 and the electric power generated by first motor generator 110.

Second motor generator 120 is provided such that a torque is transmitted to the wheels. The torque of second motor generator 120 is transmitted to front wheels 160 via reduction gear 140. Thereby, second motor generator 120 assists engine 100, and causes the vehicle to travel using the torque from second motor generator 120. It is noted that, instead of or in addition to front wheels 160, rear wheels may be driven.

During regenerative braking of the hybrid vehicle, second motor generator 120 is driven by front wheels 160 via reduction gear 140, and second motor generator 120 is operated as a generator. Thereby, second motor generator 120 is operated as a regenerative brake converting braking energy into electric power. The electric power generated by second motor generator 120 is stored in battery 150.

Motive power split mechanism 130 is composed of a planetary gear including a sun gear, a pinion gear, a carrier, and a ring gear. The pinion gear engages the sun gear and the ring gear. The carrier supports the pinion gear to be rotatable. The sun gear is coupled to a rotation shaft of first motor generator 110. The carrier is coupled to a crankshaft of engine 100. The ring gear is coupled to a rotation shaft of second motor generator 120 and reduction gear 140.

Figure 2:
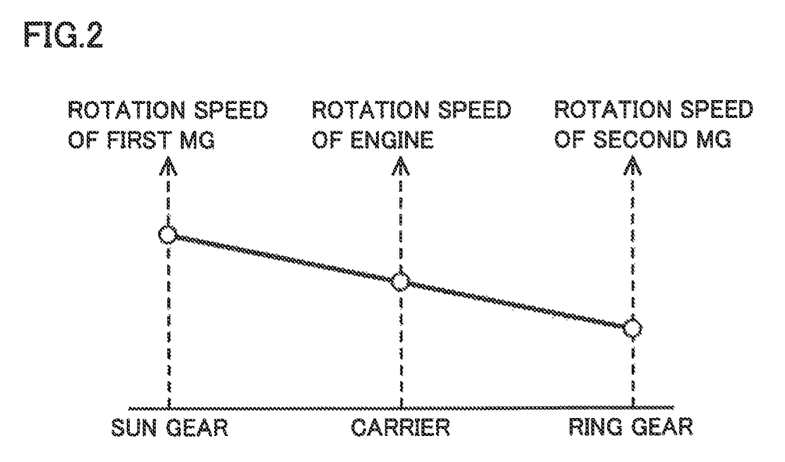
FIG. 2 is a view showing a nomograph of a motive power split mechanism.

Since engine 100, first motor generator 110, and second motor generator 120 are coupled via motive power split mechanism 130 composed of a planetary gear, the numbers of rotations of engine 100, first motor generator 110, and second motor generator 120 have the relation such that they are connected by a straight line in a nomograph, as shown in FIG. 2.

Figure 3:
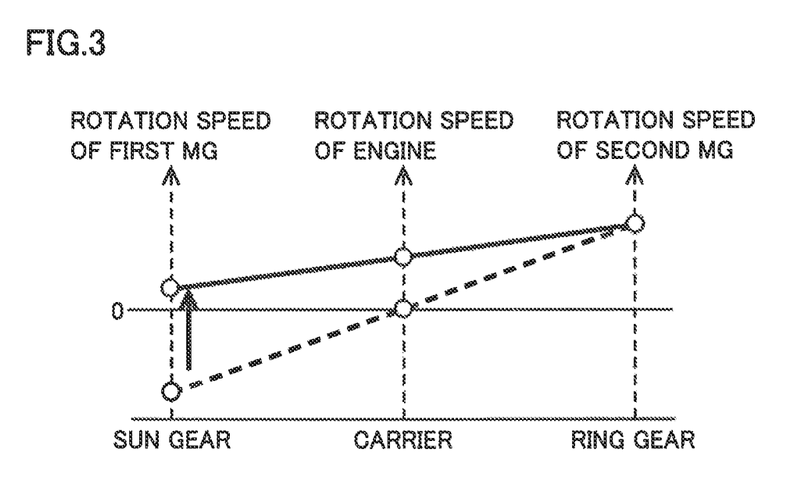
FIG. 3 is a view showing a nomograph when control for starting an engine is performed.
Figure 4:
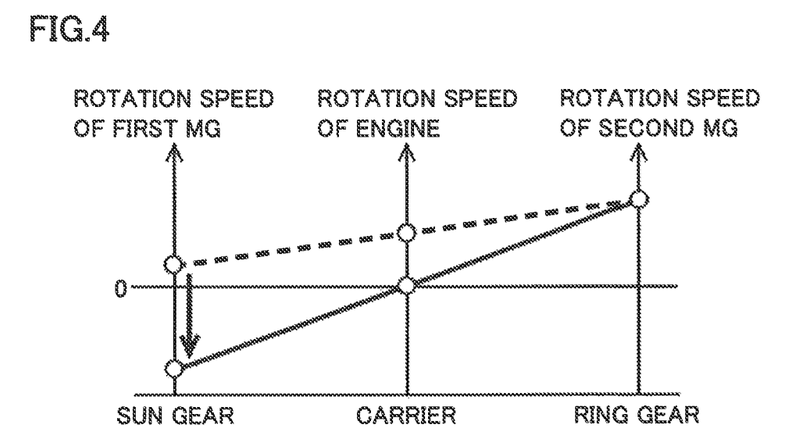
FIG. 4 is a view showing a nomograph when control for stopping the engine is performed.

When the control for starting engine 100 is performed, the number of rotations of engine 100 is increased by first motor generator 110, as shown in FIG. 3, When the control for stopping engine 100 is performed such that the predetermined crank angle is obtained, the number of rotations of engine 100 is decreased by first motor generator 110, as shown in FIG. 4.

Referring back to FIG. 1, battery 150 for traveling is an assembled battery composed by connecting a plurality of battery modules, each having a plurality of battery cells, in series. Battery 150 has a voltage of, for example, about 200 V. The electric power supplied from first motor generator 110 and second motor generator 120 is charged in battery 150.

Charging power to battery 150 is determined based on parameters including the remaining capacity of battery 150, temperature, and the like. The electric power stored in battery 150 is supplied to first motor generator 110 and second motor generator 120, and is also supplied to an auxiliary battery 240 via a DC/DC converter 230 during load operation of engine 100. When the electric power is supplied from battery 150 to auxiliary battery 240 via DC/DC converter 230, the remaining capacity of battery 150 is reduced corresponding to the electric power supplied to auxiliary battery 240. As a result, when the electric power is supplied from battery 150 to auxiliary battery 240 via DC/DC converter 230, charging power from first motor generator 110 to battery 150 is determined corresponding to the electric power supplied from battery 150 to auxiliary battery 240.

The charging power from first motor generator 110 to battery 150 may be determined by always considering the electric power supplied from battery 150 to auxiliary battery 240 as a parameter.

Engine 100, first motor generator 110, second motor generator 120, and DC/DC converter 230 are controlled by an ECU (Electronic Control Unit) 170. It is noted that ECU 170 may be divided into a plurality of ECUs.

Figure 5:
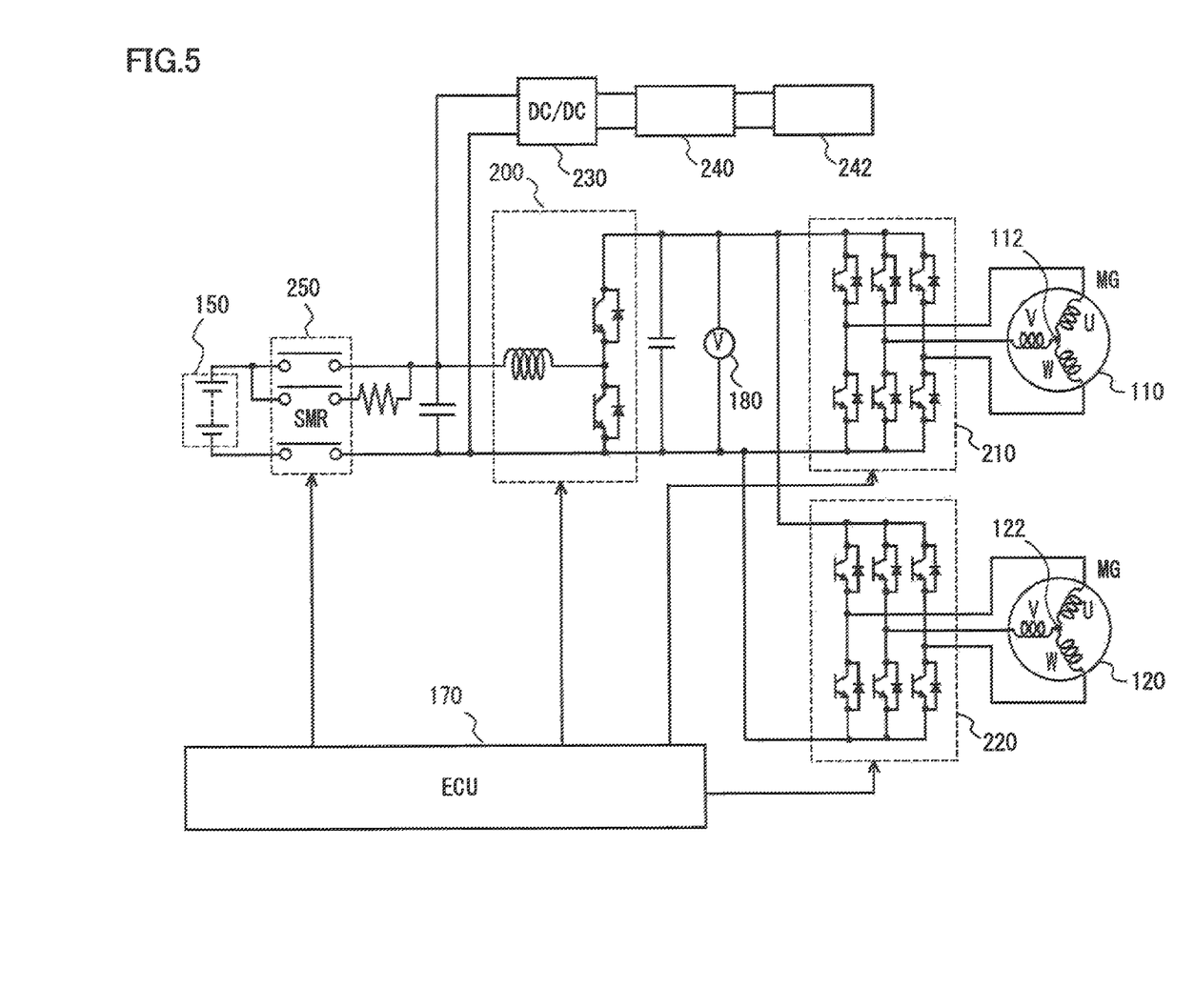
FIG. 5 is a view showing an electric system of the hybrid vehicle.

Referring to FIG. 5, an electric system of the hybrid vehicle will be further described. The hybrid vehicle is provided with a converter 200, a first inverter 210, a second inverter 220, DC/DC converter 230, auxiliary battery 240, and an SMR (System Main Relay) 250.

Converter 200 includes a reactor, two npn transistors, and two diodes. The reactor has one end connected to a positive electrode of battery 150, and the other end connected to a connection point of the two npn transistors.

The two npn transistors are connected in series. The npn transistors are controlled by ECU 170. Between a collector and an emitter of each npn transistor, each diode is connected to pass a current from the emitter to the collector.

It is noted that, as an npn transistor, for example, an IGBT (Insulated Gate Bipolar Transistor) can be used. Instead of an npn transistor, a power switching element such as a power MOSFET (Metal Oxide Semiconductor Field-Effect Transistor) can be used.

When electric power discharged from battery 150 is supplied to first motor generator 110 or second motor generator 120, the voltage is boosted by converter 200. Conversely, when electric power generated by first motor generator 110 or second motor generator 120 is charged in battery 150, the voltage is bucked by converter 200.

A system voltage VH between converter 200 and first and second inverters 210, 220 is detected by a voltmeter 180. A detection result of voltmeter 180 is transmitted to ECU 170.

First inverter 210 includes a U-phase arm, a V-phase arm, and a W-phase arm. The U-phase arm, the V-phase arm, and the W-phase arm are connected in parallel. The U-phase arm, the V-phase arm, and the W-phase arm each have two npn transistors connected in series. Between a collector and an emitter of each npn transistor, a diode passing a current from the emitter to the collector is connected. A connection point of the npn transistors in each arm is connected to an end portion of each coil of first motor generator 110 which is different from a neutral point 112.

First inverter 210 converts a DC current supplied from battery 150 into an AC current, and supplies it to first motor generator 110. Further, first inverter 210 converts an AC current generated by first motor generator 110 into a DC current.

Second inverter 220 includes a U-phase arm, a V-phase arm, and a W-phase arm. The U-phase arm, the V-phase arm, and the W-phase arm are connected in parallel. The U-phase arm, the V-phase arm, and the W-phase arm each have two npn transistors connected in series. Between a collector and an emitter of each npn transistor, a diode passing a current from the emitter to the collector is connected. A connection point of the npn transistors in each arm is connected to an end portion of each coil of second motor generator 120 which is different from a neutral point 122.

Second inverter 220 converts the DC current supplied from battery 150 into an AC current, and supplies it to second motor generator 120. Further, second inverter 220 converts an AC current generated by second motor generator 120 into a DC current.

DC/DC converter 230 is connected between battery 150 and converter 200 in parallel with converter 200. DC/DC converter 230 bucks a DC voltage. Electric power output from DC/DC converter 230 is charged in auxiliary battery 240. The electric power charged in auxiliary battery 240 is supplied to an auxiliary machine 242 such as an electrically-powered oil pump, and to ECU 170.

SMR (System Main Relay) 250 is provided between battery 150 and DC/DC converter 230. SMR 250 is a relay switching between the state in which battery 150 is connected to the electric system and the state in which battery 150 is disconnected from the electric system. When SMR 250 is in an opened state, battery 150 is disconnected from the electric system. When SMR 250 is in a closed state, battery 150 is connected to the electric system.

Specifically, when SMR 250 is in an opened state, battery 150 is electrically disconnected from DC/DC converter 230, auxiliary battery 240, auxiliary machine 242, ECU 170, and the like. When SMR 250 is in a closed state, electric power can be supplied from battery 150 to DC/DC converter 230, auxiliary battery 240, auxiliary machine 242, ECU 170, and the like.

Figure 6:
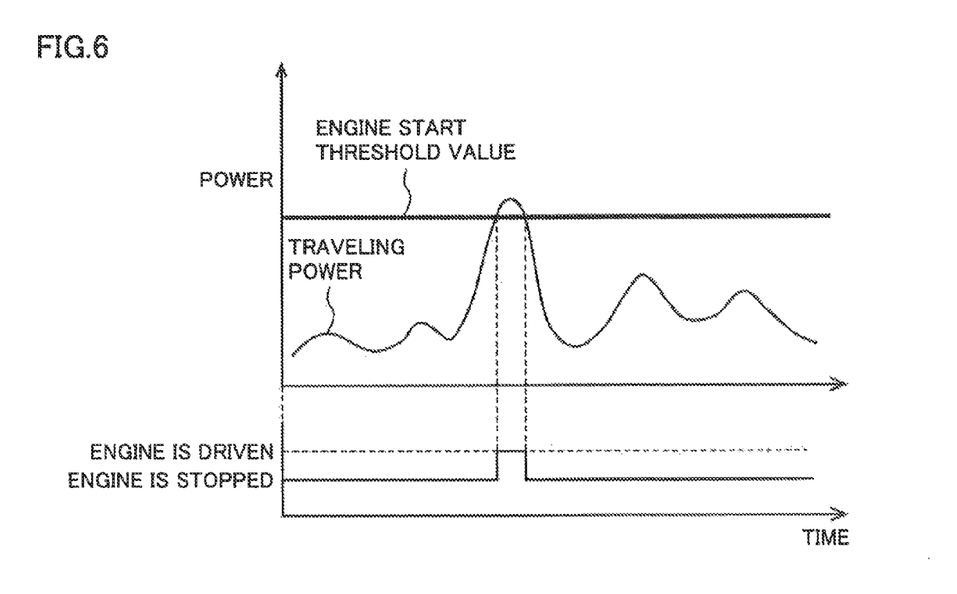
FIG. 6 is a view showing an engine start threshold value.

Referring to FIG. 6, a manner for controlling engine 100 will be further described. As shown in FIG. 6, if traveling power of the hybrid vehicle is lower than an engine start threshold value, engine 100 is stopped, and the hybrid vehicle travels using only the drive force of second motor generator 120.

On the other hand, if the traveling power of the hybrid vehicle is not less than the engine start threshold value, engine 100 is driven. Thereby, the hybrid vehicle travels using the drive force of engine 100, in addition to or instead of the drive force of second motor generator 120. Further, electric power generated by first motor generator 110 using the drive force of engine 100 is directly supplied to second motor generator 120.

The traveling power is calculated by ECU 170 in accordance with a map having, for example, the position of an accelerator pedal (accelerator pedal position) operated by a driver, a vehicle speed, and the like, as parameters. That is, in the present embodiment, the traveling power of the hybrid vehicle represents power required by the driver. It is noted that the method for calculating the traveling power is not limited thereto. In the present embodiment, power is indicated in kilowatts (kW).

The hybrid vehicle is controlled to achieve the traveling power by engine 100 and second motor generator 120 in an allocated manner. For example, when first motor generator 110 does not generate electric power, the hybrid vehicle is controlled such that the sum of output power of engine 100 and output power of second motor generator 120 is substantially identical to the traveling power. Accordingly, if the output power of engine 100 is zero, the hybrid vehicle is controlled such that the output power of second motor generator 120 is substantially identical to the traveling power. If the output power of second motor generator 120 is zero, the hybrid vehicle is controlled such that the output power of engine 100 is substantially identical to the traveling power.

When engine 100 is operated, for example, as the vehicle speed increases, the output torque of second motor generator 120 is reduced, and the ratio of the output power of engine 100 to the traveling power is increased. As an example, when the vehicle speed is higher than a threshold value, the output torque of second motor generator 120 is reduced to zero, and the hybrid vehicle travels using only the drive force of engine 100. It is noted that the manner for controlling the output power is not limited thereto.

In addition, for example, when first motor generator 110 is operated as a generator and the generated electric power is supplied from first motor generator 110 to battery 150, engine 100 is controlled to additionally output power equivalent to the electric power generated by first motor generator 110.

Hereinafter, the sum of power to be output by engine 100 of the traveling power of the hybrid vehicle and power to be output by engine 100 to cause first motor generator 110 to generate electric power and charge battery 150 will also be referred to as engine required power.

Figure 7:
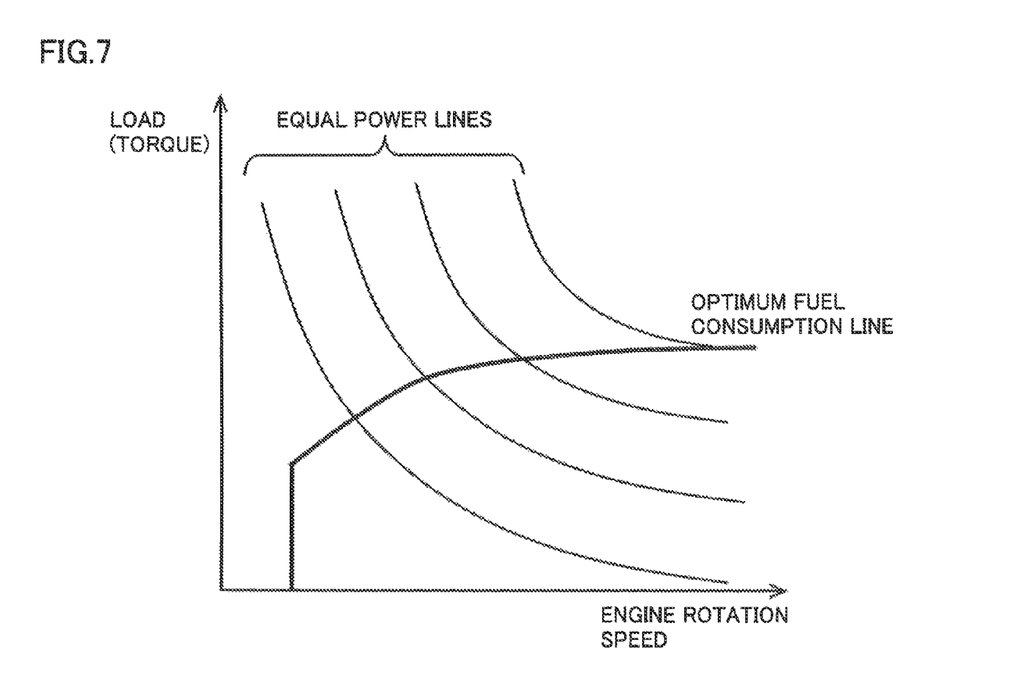
FIG. 7 is a view showing an optimum fuel consumption line.

As shown in FIG. 7, an operation point of engine 100, that is, an engine rotation number NE and a load (i.e., an output torque TE), is determined by an intersection point of the engine required power and an optimum fuel consumption line. The engine required power is indicated by equal power lines. Since the load of engine 100 is determined by the intersection point of the engine required power and the optimum fuel consumption line, the load becomes lower with a decrease in the engine required power in the present embodiment.

As described above, when first motor generator 110 is operated as a generator and the generated electric power is supplied from first motor generator 110 to battery 150, engine 100 is controlled to additionally output power equivalent to the electric power generated by first motor generator 110. Thus, as a result, engine 100 is operated at a load corresponding to the electric power generated by first motor generator 110.

Further, when first motor generator 110 is operated as a generator and the generated electric power is supplied from first motor generator 110 to battery 150, the electric power generated by first motor generator 110 is determined corresponding to the charging power to battery 150. As an example, the electric power generated by first motor generator 110 matches or substantially matches the charging power to battery 150. Here, the charging power from first motor generator 110 to battery 150 is determined corresponding to the electric power supplied from battery 150 to auxiliary battery 240. Thus, as a result, engine 100 is operated at a load corresponding to the electric power supplied from battery 150 for traveling to auxiliary battery 240 via DC/DC converter 230.

Figure 8:
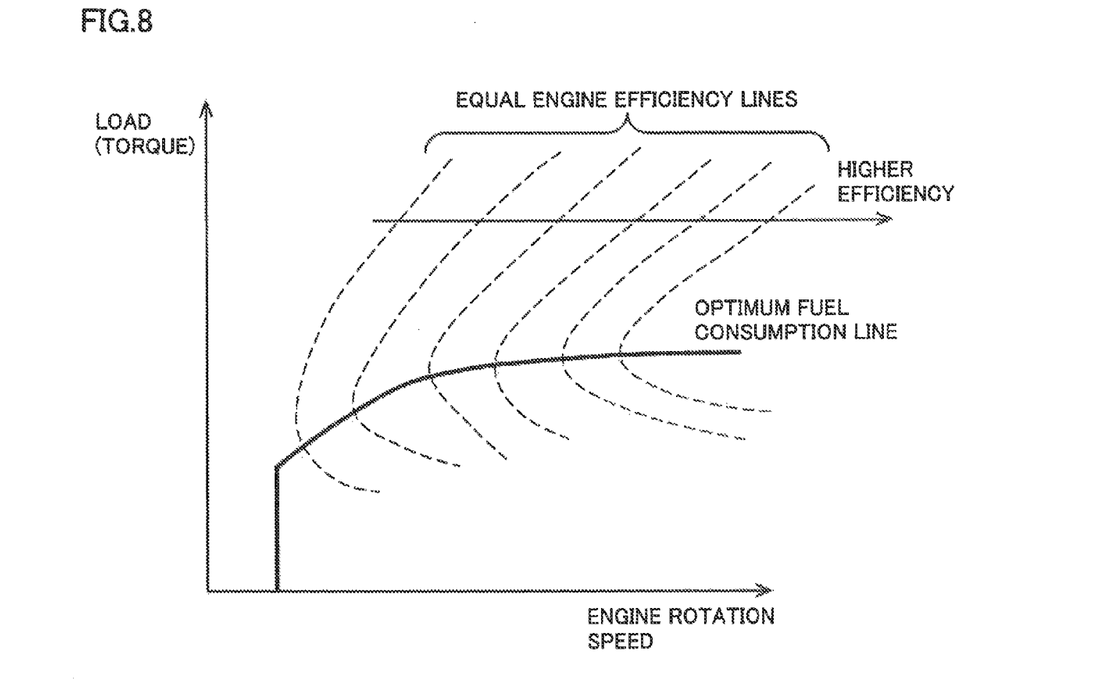
FIG. 8 is a view showing the optimum fuel consumption line and equal engine efficiency lines.

As shown in FIG. 8, the optimum fuel consumption line is a line formed by connecting operation points where engine 100 has good efficiency. In FIG. 8, the optimum fuel consumption line is indicated by a solid line, and the efficiency of engine 100 at operation points is indicated by an equal engine efficiency line as a broken line. The optimum fuel consumption line is obtained by connecting operation points where engine 100 has the highest efficiency, of the operation points on the equal power lines. The optimum fuel consumption line is predetermined by a developer based on results of an experiment and a simulation.

FIG. 8 shows that the efficiency of the engine is improved when the operation point is shifted in a higher-rotation direction along the optimum fuel consumption line such that the load, i.e., torque is increased, as a schematic characteristic of the efficiency. That is, in the present embodiment, efficiency is increased along with an increase in the load of engine 100.

As can be seen from FIG. 8, in an operation state in which the load of engine 100 is low, that is, in an operation state with low power, there is room for improvement of the efficiency of engine 100. In the present embodiment, in order to improve the efficiency of engine 100 during load operation, if the load of engine 100 is smaller than a threshold value during the load operation of engine 100, DC/DC converter 230 is controlled by ECU 170 to supply electric power from battery 150 for traveling to auxiliary battery 240.

More specifically, if the engine required power determined as power to be output by engine 100 is smaller than a threshold value during the load operation, electric power is supplied from battery 150 for traveling to auxiliary battery 240 via DC/DC converter 230.

As the threshold value, for example, a value which sets the efficiency of engine 100 to be not more than a prescribed value is determined.

On the other hand, during no-load operation of engine 100, DC/DC converter 230 is controlled by ECU 170 to stop supply of the electric power from battery 150 for traveling to auxiliary battery 240.

As an example, during idle operation of engine 100, DC/DC converter 230 is controlled by ECU 170 to stop supply of the electric power from battery 150 for traveling to auxiliary battery 240. If the load of engine 100 (engine required power) is smaller than a threshold value during operation which is not the idle operation, DC/DC converter 230 is controlled by ECU 170 to supply electric power from battery 150 for traveling to auxiliary battery 240. The idle operation is one example of the no-load operation.

Figure 9:
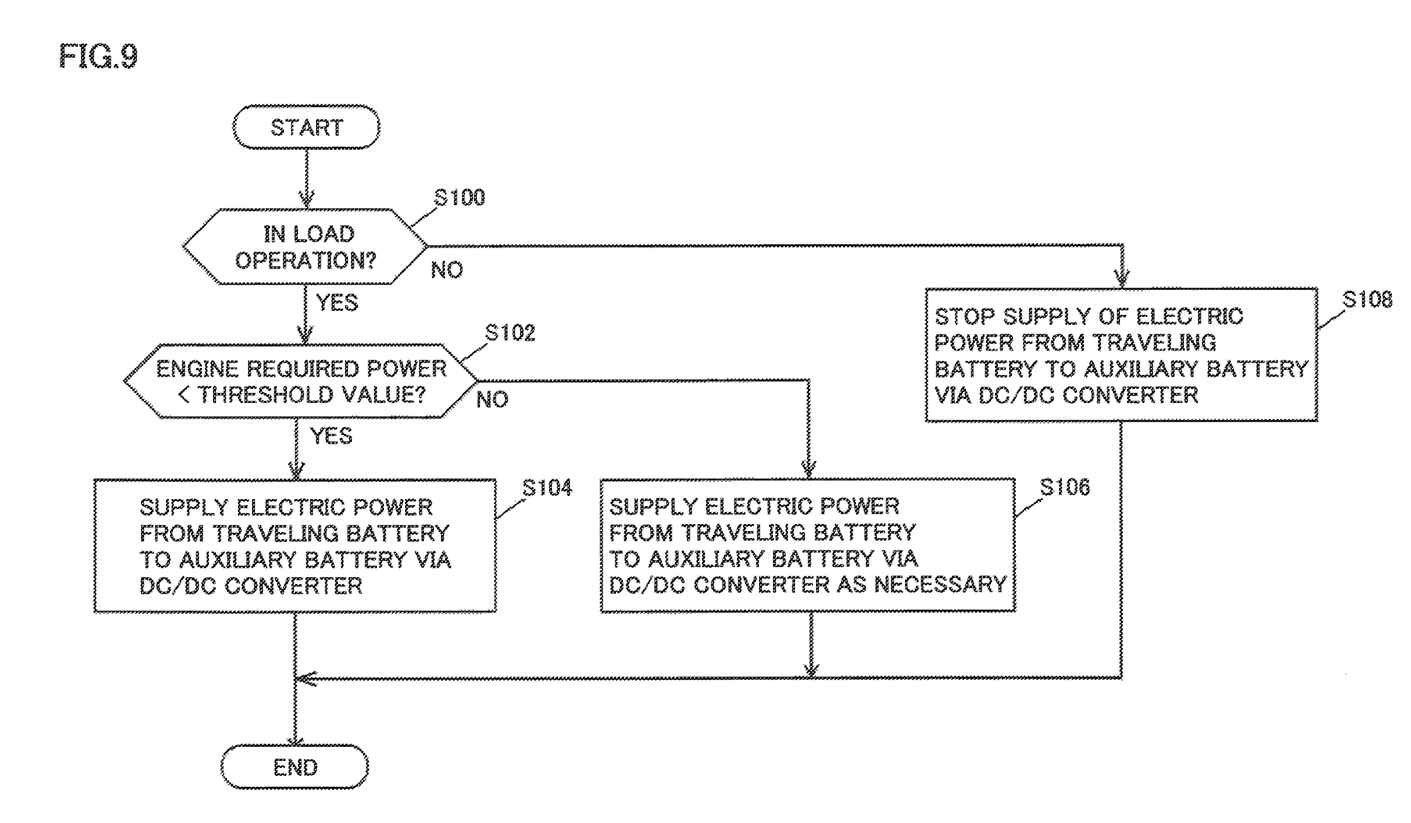
FIG. 9 is a flowchart illustrating processing performed by an ECU.

Referring to FIG. 9, processing performed by ECU 170 in the present embodiment will be described. The processing described below may be implemented by software, implemented by software, or implemented by cooperation of software and hardware.

In step (hereinafter, the step will be abbreviated as S) 100, it is determined whether or not engine 100 is in the load operation. As an example, engine 100 is determined as being in the load operation when the accelerator pedal position is greater than zero, and when engine 100 is operated to operate first motor generator 110 as a generator and charge battery 150. Since whether or not engine 100 is in the load operation can be determined using a well-known common technique, a detailed description thereof will not be repeated here.

When engine 100 is in the load operation (YES in S100), if the engine required power is smaller than a threshold value (YES in S102), in S104, electric power is supplied from battery 150 for traveling to auxiliary battery 240 via DC/DC converter 230.

If the engine required power is not less than the threshold value (NO in S102), in S106, electric power is supplied from battery 150 for traveling to auxiliary battery 240 via DC/DC converter 230, as necessary. As an example, if auxiliary battery 240 has a voltage lower than a predetermined value, electric power is supplied from battery 150 for traveling to auxiliary battery 240 via DC/DC converter 230.

On the other hand, when engine 100 is in the no-load operation, for example, in the idle operation (NO in S100), in S108, DC/DC converter 230 is controlled to stop supply of the electric power from battery 150 for traveling to auxiliary battery 240.

Similarly, also while engine 100 is stopped (NO in S100), in S108, DC/DC converter 230 is controlled to stop supply of the electric power from battery 150 for traveling to auxiliary battery 240.

As described above, in the present embodiment, if the load of engine 100 is smaller than a threshold value during the load operation of engine 100, electric power is supplied from battery 150 for traveling to auxiliary battery 240 via DC/DC converter 230. The load of engine 100 is eventually increased by supplying the electric power from battery 150 for traveling to auxiliary battery 240. Therefore, in engine 100 having a characteristic that engine 100 has good efficiency in a high-load operation region, the efficiency of engine 100 is improved.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

100; engine; 110: first motor generator; 150: battery; 170: ECU; 230: DC/DC converter; 240: auxiliary battery.

The invention claimed is:

1. A vehicle, comprising:
    a first power storage device storing electric power;
    a second power storage device connected to said first power storage device;
    a supply device supplying the electric power from said first power storage device to said second power storage device;
    an engine operated at a load corresponding to the electric power supplied from said first power storage device to said second power storage device; and
    a generator generating electric power by being driven by said engine, and supplying electric power corresponding to the electric power supplied from said first power storage device to said second power storage device, to said first storage device,
    wherein said engine is operated at a load corresponding to the electric power generated by said generator, and
    if the load of said engine is smaller than a threshold value during load operation of said engine, said supply device supplies the electric power from said first power storage device to said second power storage device.

2. The vehicle according to claim 1, wherein said supply device stops supply of the electric power from said first power storage device to said second power storage device during no-load operation of said engine.

3. The vehicle according to claim 1, wherein said supply device stops supply of the electric power from said first power storage device to said second power storage device during idle operation of said engine.

4. The vehicle according to claim 1, wherein said supply device is a converter.

5. A control method for a vehicle including a first power storage device storing electric power, a second power storage device connected to said first power storage device, a supply device supplying the electric power from said first power storage device to said second power storage device, and an engine operated at a load corresponding to the electric power supplied from said first power storage device to said second power storage device, and a generator generating electric power by being driven by said engine, and supplying electric power corresponding to the electric power supplied from said first power storage device to said second power storage device, to said first storage device, said engine being operated at a load corresponding to the electric power generated by said generator, the method comprising the steps of:
    performing load operation of said engine; and
    supplying the electric power from said first power storage device to said second power storage device if the load of said engine is smaller than a threshold value during the load operation of said engine.

6. A control device for a vehicle including a first power storage device storing electric power, a second power storage device connected to said first power storage device, a supply device supplying the electric power from said first power storage device to said second power storage device, and an engine operated at a load corresponding to the electric power supplied from said first power storage device to said second power storage device, and a generator generating electric power by being driven by said engine, and supplying electric power corresponding to the electric power supplied from said first power storage device to said second power storage device, to said first storage device, said engine being operated at a load corresponding to the electric power generated by said generator, the control device comprising:
    means for performing load operation of said engine; and
    means for supplying the electric power from said first power storage device to said second power storage device if the load of said engine is smaller than a threshold value during the load operation of said engine.

* * * * *